(12) United States Patent
Lim et al.

(10) Patent No.: US 11,821,877 B2
(45) Date of Patent: Nov. 21, 2023

(54) APPARATUS AND METHOD FOR IMPACT TEST

(71) Applicants: HYUNDAI MOTOR COMPANY, Seoul (KR); KIA CORPORATION, Seoul (KR); PUSAN NATIONAL UNIVERSITY INDUSTRY-UNIVERSITY COOPERATION FOUNDATION, Busan (KR)

(72) Inventors: Sang Won Lim, Seoul (KR); Sang Yoon Park, Seoul (KR); Yong Beom Lee, Seoul (KR); Sang Jae Yoon, Yongin-si (KR); Chi Hoon Choi, Suwon-si (KR); Jeong Kim, Busan (KR)

(73) Assignees: HYUNDAI MOTOR COMPANY, Seoul (KR); KIA CORPORATION, Seoul (KR); PUSAN NAT. UNI. INDUSTRY-UNIVERSITY COOP.FDN., Busan (KR)

(*) Notice: Subject to any disclaimer, the term of this patent is extended or adjusted under 35 U.S.C. 154(b) by 184 days.

(21) Appl. No.: 17/373,154

(22) Filed: Jul. 12, 2021

(65) Prior Publication Data
US 2022/0155197 A1    May 19, 2022

(30) Foreign Application Priority Data
Nov. 13, 2020    (KR) .................. 10-2020-0152030

(51) Int. Cl.
G01N 3/307    (2006.01)
G01M 17/007    (2006.01)
G01N 3/317    (2006.01)

(52) U.S. Cl.
CPC ........ *G01N 3/307* (2013.01); *G01M 17/0078* (2013.01); *G01N 3/317* (2013.01);
(Continued)

(58) Field of Classification Search
CPC .. G01N 3/307; G01N 3/317; G01N 2203/001; G01N 2203/0044; G01N 2203/005; G01M 17/0078
(Continued)

(56) References Cited

U.S. PATENT DOCUMENTS 8,979,033 B2    3/2015    Hunter et al.
9,567,108 B2    2/2017    Hunter et al.
2012/0187249 A1    7/2012    Hunter et al.

FOREIGN PATENT DOCUMENTS

KR    20110119186 A    *    1/2011

OTHER PUBLICATIONS

Translation of KR-20110119186-A (Year: 2011).*
(Continued)

*Primary Examiner* — Nathaniel T Woodward
(74) *Attorney, Agent, or Firm* — MCDONNELL BOEHNEN HULBERT & BERGHOFF LLP (57) ABSTRACT

The present disclosure relates to an apparatus and a method for an impact test, which can easily accelerate an impact body at a desired acceleration using an air pressure and an electromagnetic force. According to an embodiment of the present disclosure, an apparatus for an impact test includes a clamping unit configured to fix a specimen, and an impact unit disposed to be spaced apart from the clamping unit and configured to accelerate and launch an impact body to collide with the specimen by an air pressure and an electromagnetic force.

15 Claims, 7 Drawing Sheets

(52) U.S. Cl.
CPC . *G01N 2203/001* (2013.01); *G01N 2203/005* (2013.01); *G01N 2203/0044* (2013.01)

(58) Field of Classification Search
USPC ........................................................ 73/12.01
See application file for complete search history.

(56) References Cited

OTHER PUBLICATIONS

Kim, Hong-Kyo, et al., "High velocity impact resistance test of fiber metal laminate (FML) by using electromagnetic launcher and its numerical analysis," SASE 2019 Spring Conference, pp. 1-3, 2019.

* cited by examiner

APPARATUS AND METHOD FOR IMPACT TEST

CROSS REFERENCE TO RELATED APPLICATIONS

The present application claims priority of Korean Patent Application No. 10-2020-0152030 filed on Nov. 13, 2020, the entire contents of which is incorporated herein for all purposes by this reference.

BACKGROUND

Field

The present disclosure relates to an apparatus and a method for an impact test, and more particularly, to an apparatus and a method for an impact test, which can easily accelerate an impact body at a desired acceleration using an air pressure and an electromagnetic force.

Description of the Related Art

In a vehicle development stage, various stability evaluations are conducted to secure stability of a vehicle.

Among tests to evaluate the stability of the vehicle, a representative test method is an impact test.

The impact test is briefly classified into a test to evaluate stability with respect to the front and rear sides of the vehicle and a test to evaluate stability with respect to sides of the vehicle.

The test to evaluate the stability with respect to the front and rear sides of the vehicle is performed by a method for the vehicle to check an impact against the impact speed through forward and backward movement of the vehicle.

Further, the test to evaluate the safety with respect to the sides of the vehicle is performed by a method for checking the degree of impact by making an impact body, which has been accelerated at a predetermined speed, collide with the side of the vehicle in a state where the vehicle is fixed since the vehicle is unable to move laterally.

Accordingly, in the impact test with respect to the side of the vehicle, an acceleration device for accelerating the impact body at a desired speed is prepared.

As a general acceleration device in the related art, a launcher using an air pressure or a launcher using gunpowder is mainly used, and recently, the launcher using the air pressure has been used as a test device which facilitates the speed adjustment of the impact body and which is relatively safe.

However, the launcher in the related art using the air pressure requires a wide space in which the compressed air can be expanded enough to obtain the desired speed since the impact body is accelerated using an expansion force of the compressed air.

Accordingly, in a limited space, acceleration of the impact body at the desired speed is restricted.

The foregoing is intended merely to aid in the understanding of the background of the present disclosure, and is not intended to mean that the present disclosure falls within the purview of the related art that is already known to those of ordinary skill in the art.

SUMMARY

The present disclosure is proposed to solve the above-mentioned problems, and provides an apparatus and a method for an impact test, which can easily accelerate an impact body at a desired acceleration in a limited space using an air pressure and an electromagnetic force.

According to an embodiment of the present disclosure, an apparatus for an impact test includes a clamping unit configured to fix a specimen, and an impact unit disposed to be spaced apart from the clamping unit and configured to accelerate and launch an impact body to collide with the specimen by an air pressure and an electromagnetic force.

The clamping unit is configured to vary positions in vertical and horizontal directions and an installation angle of the fixed specimen.

The clamping unit includes a first guide frame provided with a pair of vertical guide rails spaced apart from each other in a horizontal direction and disposed in parallel to each other along a vertical direction, and a pair of horizontal fixed bars each having both ends connected to end portions of the pair of vertical guide rails, a second guide frame provided with a pair of vertical moving bars disposed between the pair of vertical guide rails and configured to move in the vertical direction along the vertical guide rails, and a pair of horizontal guide rails spaced apart from each other in the vertical direction and disposed in parallel to each other along the vertical direction, a moving frame provided with a pair of horizontal moving bars disposed between the pair of horizontal guide rails and configured to move in the horizontal direction along the horizontal guide rails, and a pair of vertical fixed bars each having both ends connected to end portions of the pair of horizontal moving bars, a pair of rotating plates provided on the pair of vertical fixed bars, respectively, and a fixed frame having both ends fixed to the pair of rotating plates, wherein an installation angle of the fixed frame is adjusted in accordance with a rotation of the rotating plates and the specimen is fixed to the fixed frame.

The impact unit includes a compressed air module configured to provide an air pressure to the impact body in a direction in which the impact body is launched, an electromagnetic force module configured to provide an electromagnetic force to the impact body in the direction in which the impact body is launched, and a guide module configured to guide a path in which the impact body is launched.

The compressed air module includes a chamber configured to provide a space in which a compressed air is expanded, and a first acceleration tube communicating with the chamber and configured to pass the expanded air therethrough.

The electromagnetic force module includes a second acceleration tube connected to communicate with a front end of the first acceleration tube to form a path in which the impact body is accelerated to move, and an electromagnet installed on an outer periphery of the second acceleration tube and configured to form a magnetic field in a direction in which the impact body moves forward through a power supply thereto.

The guide module corresponds to a pair of guide bars installed to extend forward from an inner periphery of the second acceleration tube.

The first acceleration tube and the second acceleration tube communicate with each other in a straight line, and are disposed in a vertical direction with respect to a gravity direction.

An inner diameter of the first acceleration tube is smaller than a diameter of the impact body, and an inner diameter of the second acceleration tube is larger than the diameter of the impact body.

The second acceleration tube is formed of a glass fiber reinforced plastic.

The impact body includes: an outer body formed in a hollowed semispherical shape, an inner body formed in a hollowed semispherical shape and disposed on an inner periphery of the outer body, and a combined body provided with an accelerometer and combined with a rear end of the outer body and the inner body.

The outer body is made of a rubber material, and the inner body is made of a metal material having magnetism.

A groove portion for concentrating the air pressure is formed at a rear end of the combined body.

According to an embodiment of the present disclosure, a method for an impact test includes: fixing a specimen, accelerating an impact body using an air pressure and an electromagnetic force, launching the accelerated impact body and making the impact body collide with the fixed specimen, and measuring an acceleration value of the launched impact body and an impact value generated on the specimen.

The accelerating includes primarily accelerating the impact body by the air pressure, and secondarily accelerating the impact body by generating a magnetic field around the primarily accelerated impact body.

The accelerating includes measuring a first acceleration value of the impact body being accelerated in the primarily accelerating, calculating a corrected acceleration value through comparison of the first acceleration value with a second acceleration value predetermined to make the impact body collide with the specimen, and adjusting a direction and strength of the magnetic field in the secondarily accelerating to reflect the corrected acceleration value.

According to the embodiments of the present disclosure, since the impact body is primarily accelerated using the air pressure and is secondarily accelerated using the electromagnetic force, it can be expected to easily accelerate the impact body at the desired speed in a limited space through adjustment of the electromagnetic force. Accordingly, the volume of the apparatus for the impact test can be reduced.

Further, since the impact body can be accelerated in two stages, the acceleration accuracy of the impact body can be improved.

Further, according to the embodiments of the present disclosure, since the position and the installation angle of the specimen can be easily changed, and the acceleration of the impact body can be easily set, it can be expected to be able to perform the impact test on various conditions.

BRIEF DESCRIPTION OF THE FIGURES

The above and other objects, features and advantages of the present disclosure will be more clearly understood from the following detailed description taken in conjunction with the accompanying drawings, in which.

DETAILED DESCRIPTION

Hereinafter, embodiments of the present disclosure will be described in more detail with reference to the accompanying drawings. However, the present disclosure is not limited to embodiments as disclosed hereinafter, but may be embodied in various different forms. However, the embodiments as described hereinafter are only for specific details provided to complete the present disclosure and to assist those of ordinary skill in the art to which the present disclosure pertains in a comprehensive understanding of the disclosure. In the drawings, the same reference numerals denote the same elements.

Figure 1:
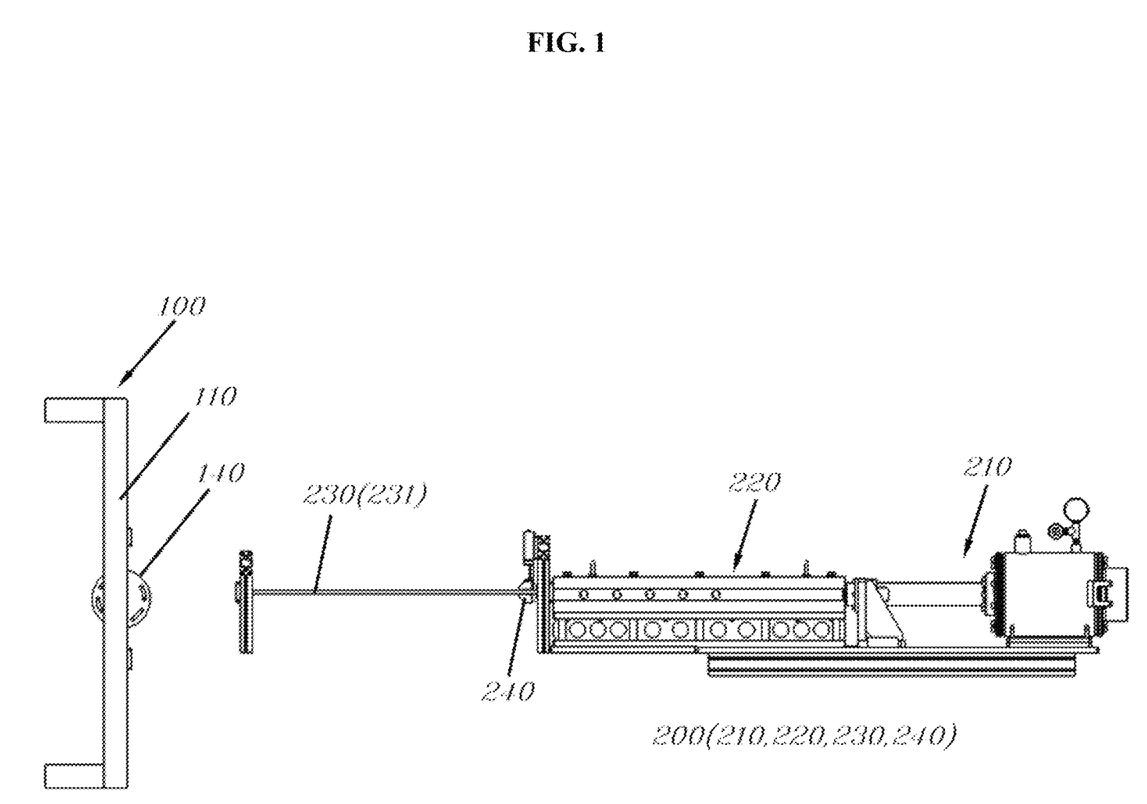
FIG. 1 is a front view showing an apparatus for an impact test according to an embodiment of the present disclosure.
Figure 2:
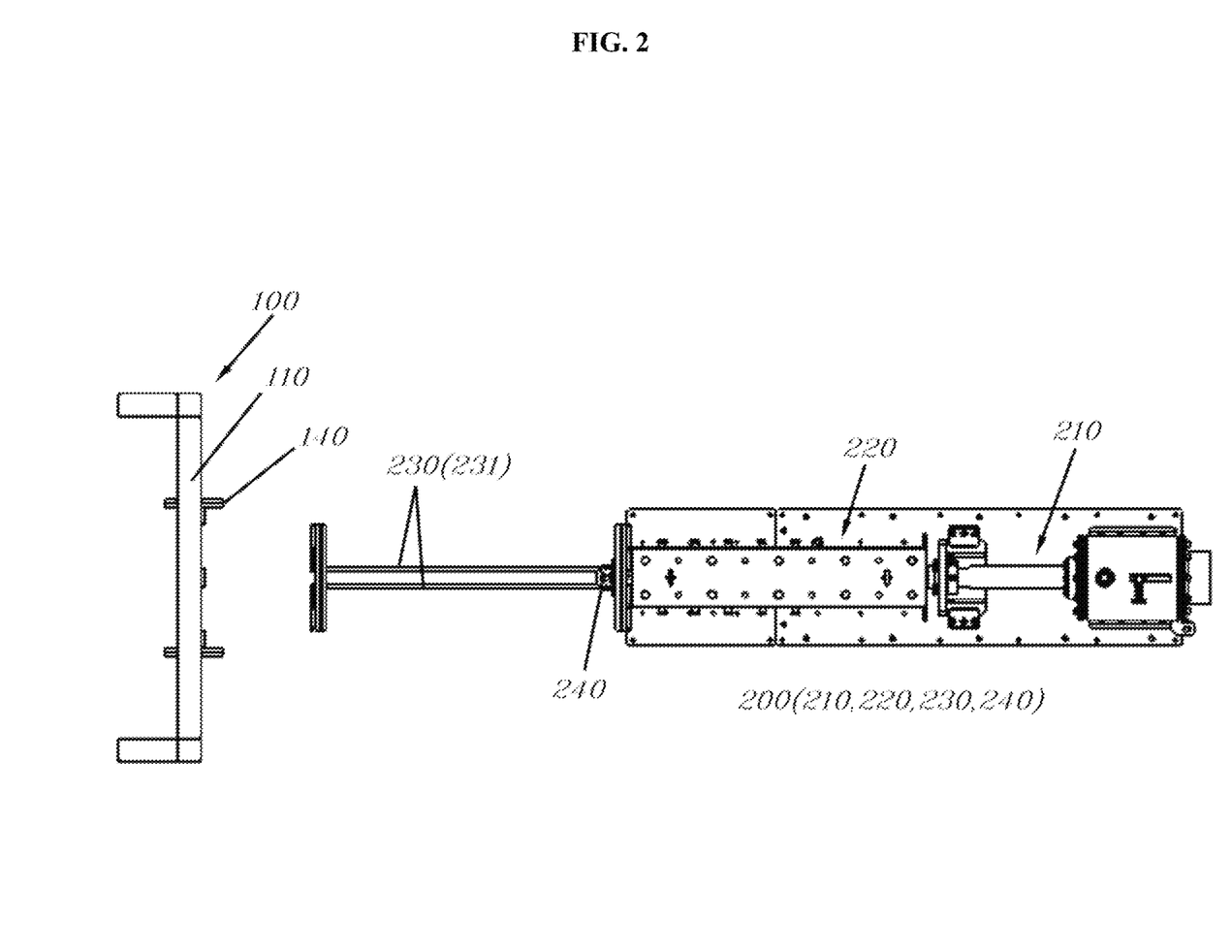
FIG. 2 is a plan view showing an apparatus for an impact test according to an embodiment of the present disclosure.
Figure 3:
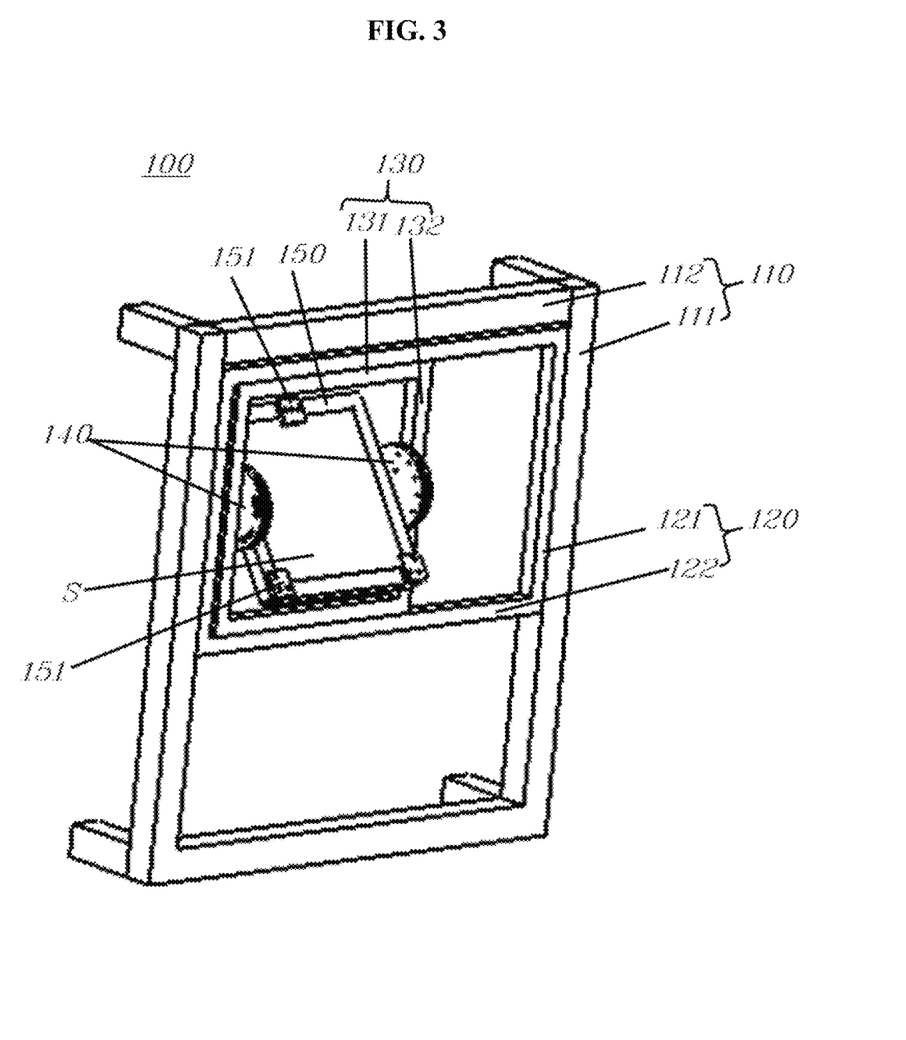
FIG. 3 is a perspective view showing a clamping unit of an apparatus for an impact test according to an embodiment of the present disclosure.
Figure 4:
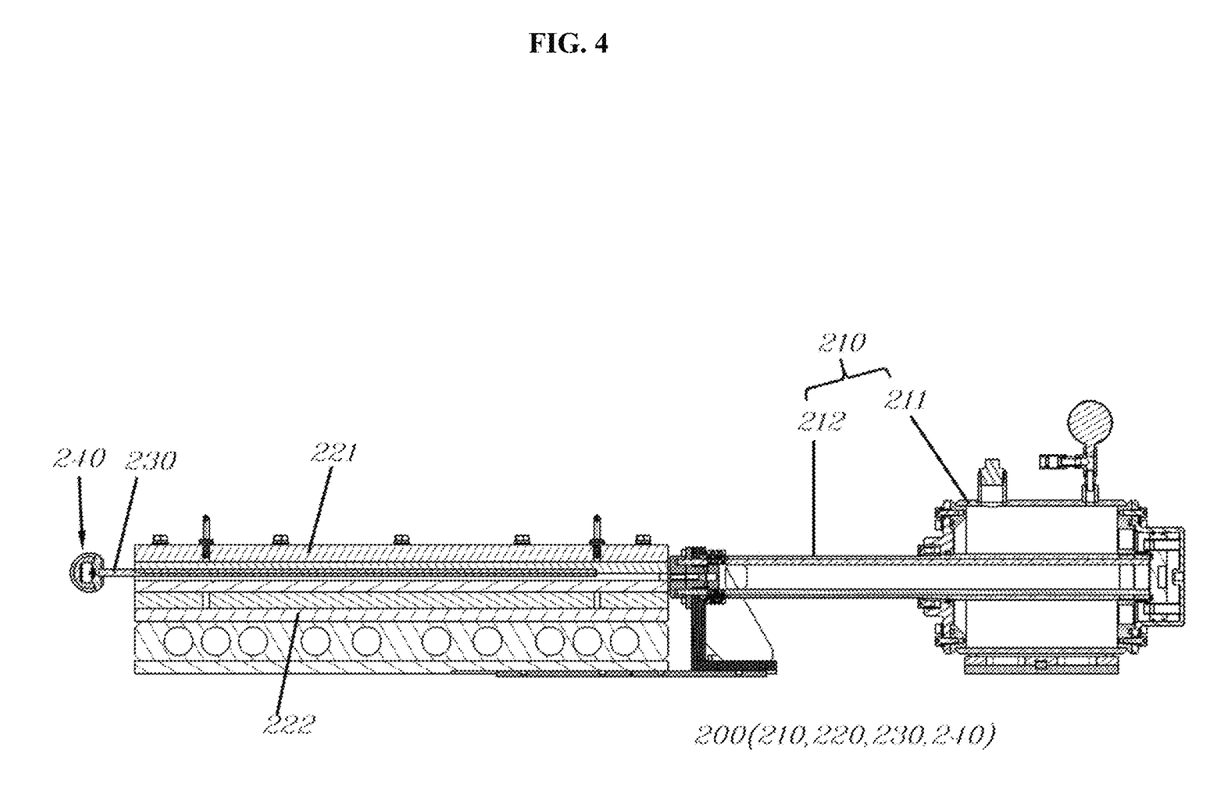
FIG. 4 is a cross-sectional view showing an impact unit of an apparatus for an impact test according to an embodiment of the present disclosure.
Figure 5:
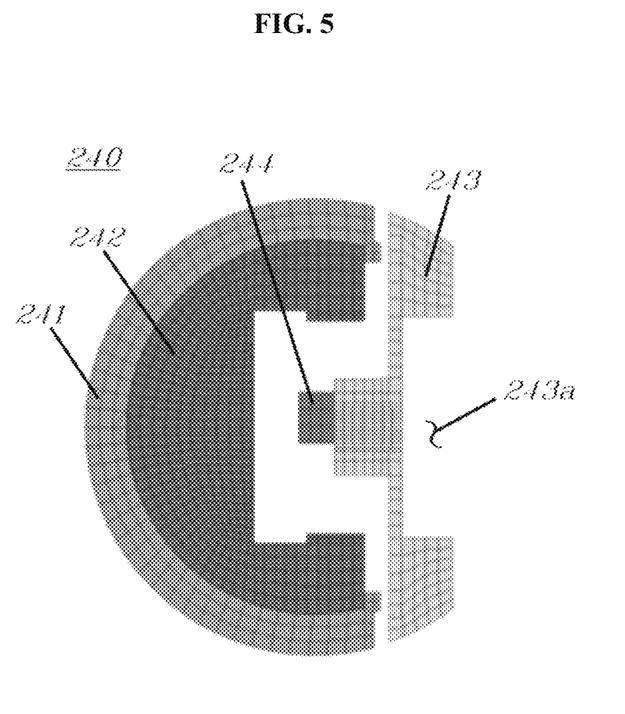
FIG. 5 is a diagram showing an impact body of an apparatus for an impact test according to an embodiment of the present disclosure.
Figure 6:
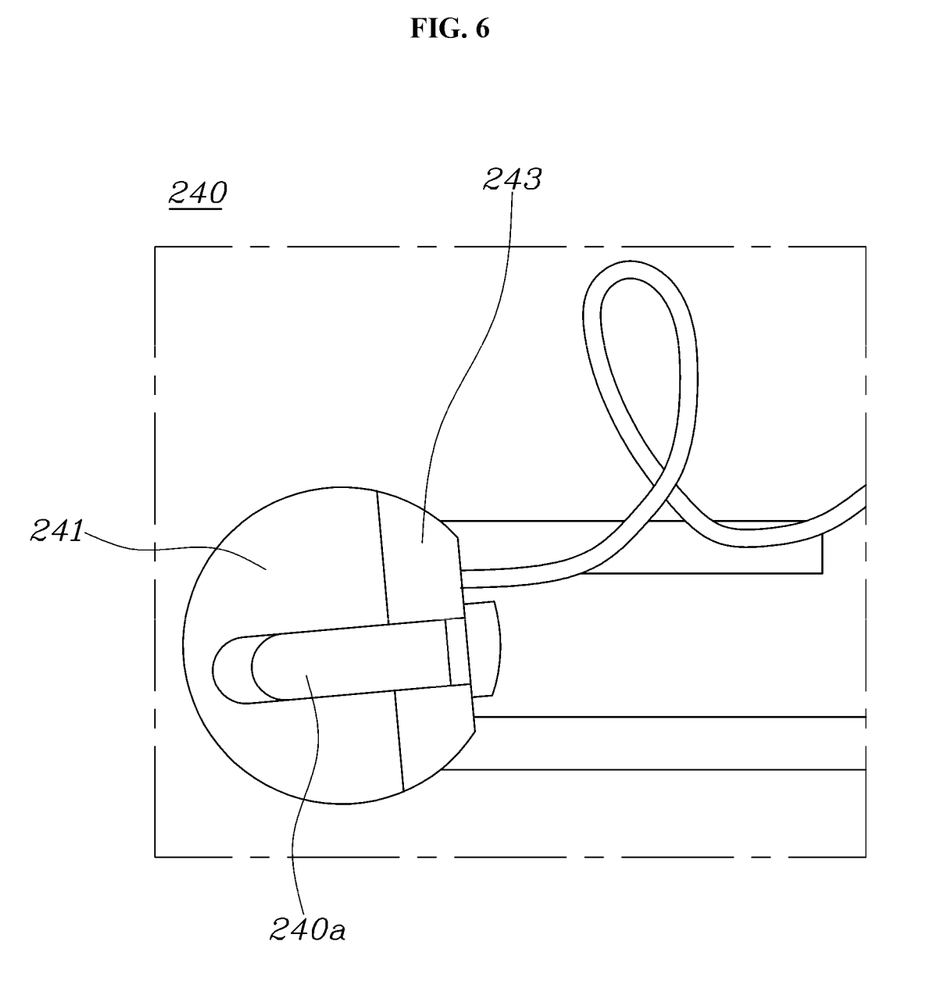
FIG. 6 is a photograph showing an impact body of an apparatus for an impact test according to an embodiment of the present disclosure.
Figure 7:
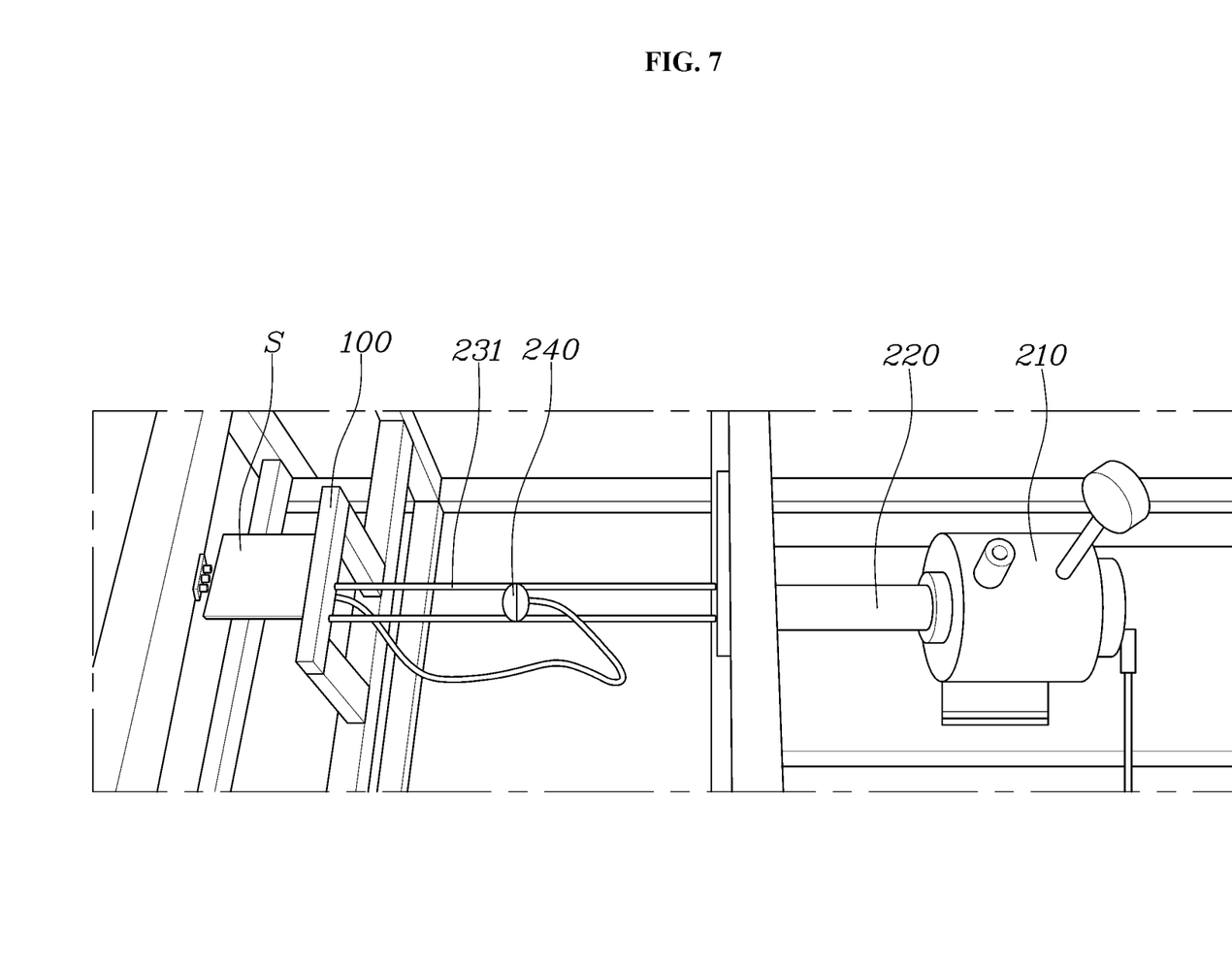
FIG. 7 is a photograph showing a use state of an apparatus for an impact test according to an embodiment of the present disclosure.

FIG. 1 is a front view showing an apparatus for an impact test according to an embodiment of the present disclosure, FIG. 2 is a plan view showing an apparatus for an impact test according to an embodiment of the present disclosure, FIG. 3 is a perspective view showing a clamping unit of an apparatus for an impact test according to an embodiment of the present disclosure, FIG. 4 is a cross-sectional view showing an impact unit of an apparatus for an impact test according to an embodiment of the present disclosure, FIG. 5 is a diagram showing an impact body of an apparatus for an impact test according to an embodiment of the present disclosure, FIG. 6 is a photograph showing an impact body of an apparatus for an impact test according to an embodiment of the present disclosure, and FIG. 7 is a photograph showing a use state of an apparatus for an impact test according to an embodiment of the present disclosure.

As illustrated in FIGS. 1-3, an apparatus for an impact test according to an embodiment of the present disclosure includes a clamping unit 100 configured to fix a specimen S, and an impact unit 200 disposed to be spaced apart from the clamping unit 100 and configured to accelerate and launch an impact body 240 to collide with the specimen S by an air pressure and an electromagnetic force.

The clamping unit 100 is a unit for fixing the specimen S intended to be measured to a desired posture and position, and is configured to vary positions in vertical and horizontal directions and an installation angle of the fixed specimen S.

For example, as illustrated in FIG. 3, the clamping unit 100 includes a first guide frame 110, a second guide frame 120 moving in a gravity direction, that is, in a vertical direction to the ground surface, inside the first guide frame 110, a moving frame 130 moving in a vertical direction to the gravity direction, that is, in a horizontal direction to the ground surface, inside the second guide frame 120, a pair of rotating plates 140 provided inside the moving frame 130, and a fixed frame 150 having both ends installed on the pair of rotating plates 140 to adjust the installation angle.

The first guide frame 110 is a means for moving the fixed frame 150, to which the specimen S is fixed, in the gravity direction, that is, in the horizontal direction to the ground surface. The first guide frame 110 includes a pair of vertical guide rails 111 spaced apart from each other in the horizontal direction and disposed in parallel to each other along the vertical direction, and a pair of horizontal fixed bars 112 each having both ends connected to end portions of the pair of vertical guide rails 111. Accordingly, the pair of vertical guide rails 111 form opposite sides, and the pair of horizontal fixed bars 112 form other opposite sides, so that a substantially quadrangular frame shape is provided.

The second guide frame 120 is a means for moving the fixed frame 150, to which the specimen S is fixed, in the vertical direction to the gravity direction, that is, in the vertical direction to the ground surface. The second guide frame 120 includes a pair of vertical moving bars 121 disposed between the pair of vertical guide rails 111 and configured to move in the vertical direction along the vertical guide rails 111, and a pair of horizontal guide rails 122 spaced apart from each other in the vertical direction and disposed in parallel to each other along the vertical direction. Accordingly, the pair of vertical moving bars 121 form opposite sides, and the pair of horizontal guide rails 122 form other opposite sides, so that a substantially quadrangular frame shape is provided. In this case, since the second guide frame 120 is to move in the vertical direction inside the first guide frame 110, it is formed with a size that is smaller than the size of the first guide frame 110.

The moving frame 130 is a means for adjusting the installation angle of the fixed frame 150, to which the specimen S is fixed, by means of a pair of rotating plates 140 while the fixed frame 150 is installed. with the moving frame 130 includes a pair of horizontal moving bars 131 disposed between the pair of horizontal guide rails 122 and configured to move in the horizontal direction along the horizontal guide rails 122, and a pair of vertical fixed bars 132 each having both ends connected to end portions of the pair of horizontal moving bars 131. Accordingly, the pair of horizontal moving bars 131 form opposite sides, and the pair of vertical fixed bars 132 form other opposite sides, so that a substantially quadrangular frame shape is provided. In this case, since the moving frame 130 is to move in the horizontal direction inside the second guide frame 120, it is formed with a size that is smaller than the size of the second guide frame 120.

The pair of rotating plates 140 are provided to face the pair of vertical fixed bars 132, respectively. In this case, the rotating plate 140 is formed in a substantially circular plate shape, and is rotated on the vertical fixed bar 132 based on its center shaft.

The fixed frame 150 is a substantially quadrangular frame to which the specimen S is fixed, and has both ends fixed to the pair of rotating plates 140, respectively and the installation angle thereof is adjusted by the rotation of the rotating plates 140.

In this case, at least one clamp 151 for fixing the specimen S is provided on the fixed frame 150.

In particular, in order to rotatably fix the specimen S onto the fixed frame 150, anyone of the clamps 151 may be hinge-engaged with the fixed frame 150, and the specimen S can be rotatably installed on the fixed frame 150 by the rotation of the hinge.

Meanwhile, the impact unit 200 is a unit configured to launch the impact body 240 that collides with the specimen S in the impact test at a desired acceleration, and includes a compressed air module 210 configured to provide an air pressure to the impact body 240 in the direction in which the impact body 240 is launched, an electromagnetic force module 220 configured to provide an electromagnetic force to the impact body 240 in the direction in which the impact body 240 is launched, and a guide module 230 configured to guide a path in which the impact body 240 is launched.

The compressed air module 210 is a module having a similar construction and operation to those of a general launcher in the related art using the air pressure, and for example, as illustrated in FIG. 4, the compressed air module 210 includes a chamber 211 configured to provide a space in which a compressed air is expanded, and a first acceleration tube 212 communicating with the chamber 211 and configured to pass the expanded air therethrough.

Accordingly, if the compressed air is supplied into the chamber 211, the compressed air is expanded in the inner space of the chamber 211, and the expanded air launches the impact body 240 disposed at the front end of the first acceleration tube 212 while passing through the first acceleration tube 212. In this case, the force launching the impact body 240 can be adjusted by adjusting an amount of the compressed air being supplied to the chamber 211 or by adjusting the degree of compression of the air being supplied into the chamber 211.

The electromagnetic force module 220 is a module generating a magnetic field through a power supply thereto and accelerating the impact body 240 by the electromagnetic force being generated by the generated magnetic field, and for example, as illustrated in FIG. 4, the electromagnetic force module 220 includes a second acceleration tube 221 connected to communicate with a front end of the first acceleration tube 212 and to form a path in which the impact body 240 is accelerated to move, and an electromagnet 222 installed on an outer periphery of the second acceleration tube 221 and configured to form the magnetic field in a direction in which the impact body 240 moves forward through the power supply thereto.

In this case, the first acceleration tube 212 and the second acceleration tube 221 communicate with each other in a straight line, and are disposed in a vertical direction with respect to a gravity direction.

Further, an inner diameter of the first acceleration tube 212 is smaller than a diameter of the impact body 240. Accordingly, the impact body 240 disposed at the front end of the first acceleration tube 212 comes in close contact with the front end of the first acceleration tube 212, and transfers the force to launch the impact body 240 in a state in which the leak of the expanded air that passes through the interior of the first acceleration tube 212 is minimized.

Further, an inner diameter of the second acceleration tube 221 is larger than the diameter of the impact body 240. Accordingly, the acceleration of the impact body 240 by means of the electromagnetic force is sufficiently maintained through minimization of the contact or friction of the impact body 240 with an inner periphery of the second acceleration tube 221 while the impact body 240 launched by the expanded air passes through the second acceleration tube 221.

Meanwhile, since the second acceleration tube 221 comes in contact with or is rubbed on the impact body 240 accelerated at high speed, it is preferable that the second acceleration tube 221 is formed of a fiber reinforced plastic so that the second acceleration tube 221 is not damaged or does not wear out due to the contact with or friction on the impact body 240. In particular, since the magnetic field is formed around the second acceleration tube 221, it is preferable that glass fiber is used as the reinforced fiber contained in the fiber reinforced plastic in order to minimize the influence on the magnetic field.

Further, the electromagnet is a means for generating the magnetic field inside the second acceleration tube 221 through the power supply thereto, and may be implemented in the form of a coil surrounding an outer periphery of the second acceleration tube 221. Of course, the electromagnet 222 is not limited to being implemented in the form of a coil, but will be able to be embodied in various changed methods capable of generating the magnetic field in a desired direction inside the second acceleration tube 221 by the power supply thereto.

Meanwhile, the guide module 230 is a module configured to guide the movement path of the impact body 240 until the impact body 240 having passed through the second acceleration tube 221 collides with the specimen S, and in the present embodiment, the guide module 230 is implemented by a pair of guide bars 231 installed to extend forward from the inner periphery of the second acceleration tube 221. Of course, the guide module 230 is not limited to being implemented in the form of a pair of guide bars 231, but will be able to be embodied in various changed methods which do not change the acceleration at a considerable level while the impact body 240 moves.

The impact body 240 is a means for being launched in a state in which it is primarily accelerated by the above-described compressed air module and then is secondarily accelerated by the electromagnetic force module, and for colliding with the specimen S, and an accelerometer 244 for measuring the acceleration of the impact body 240 is built in the impact body 240.

For example, as illustrated in FIG. 5, the impact body 240 includes an outer body 241 formed in a hollowed semi-spherical shape, an inner body 242 formed in a hollowed semispherical shape and disposed on an inner periphery of the outer body 241, and a combined body 243 provided with the accelerometer 244 and combined with a rear end of the outer body 241 and the inner body 242.

In this case, it is preferable that the outer body 241 is made of a rubber material and the inner body 242 is made of a metal material having magnetism. Accordingly, it is preferable that the impact body is prevented from being damaged by the outer body 241 when the impact body 240 collides with the specimen S, and the inner body 242 made of a metal material is able to be accelerated by the magnetic field generated by the electromagnetic force module 220.

Meanwhile, a groove portion 243a for concentrating the expanded air may be formed at a rear end of the combined body 243 in order to improve or maintain the driving force by the air pressure generated by the compressed air module 210.

Further, as illustrated in FIG. 6, on the outer periphery of the impact body 240, the guide groove 240a for guiding the impact body 240 by the guide module 230, that is, the guide bar 231, may be formed. In this case, it is preferable that the guide groove 240a is formed in a shape corresponding to the number and the shape of the guide bars 231.

Accordingly, since the guide groove 240a of the impact body 240 is guided by the guide bars 231, the impact body 240 moves in a desired path without separating from the guide bars 231.

A method for performing an impact test of a specimen using the apparatus for the impact test described above includes fixing the specimen S onto the clamping unit 100, accelerating the impact body 240 using an air pressure and an electromagnetic force generated by the impact unit 200, launching the accelerated impact body 240 and making the impact body 240 collide with the fixed specimen S, and measuring an acceleration value of the launched impact body 240 and an impact value generated on the specimen S.

The fixing sets the position of the specimen S by moving the second guide frame 120 in the vertical direction in the first guide frame 110 and moving the moving frame 130 in the horizontal direction in the second guide frame 120 after fixing the specimen S on the fixed frame 150 of the clamping unit 100. Further, the fixing sets the installation angle of the specimen S by rotating the rotating plates 140.

Once the position of the specimen S is set, the accelerating the impact body 240 is performed.

The accelerating includes primarily accelerating the impact body 240 by the air pressure generated by the compressed air module 210, and secondarily accelerating the impact body 240 by generating a magnetic field around the primarily accelerated impact body 240 using the electromagnetic force module 220.

In this case, it is preferable that the accelerating measures a first acceleration value of the impact body 240 being accelerated in the primarily accelerating, calculates a corrected acceleration value through comparison of the first acceleration value with a second acceleration value predetermined to make the impact body 240 collide with the specimen S, and adjusts the direction and the strength of the magnetic field in the secondarily accelerating to reflect the corrected acceleration value.

The impact body 240, of which the acceleration is adjusted to the desired acceleration through the primarily accelerating and the secondarily accelerating processes, moves in the direction of the specimen S through guiding of the guide module 230, and collides with the specimen S.

The colliding measures the acceleration of the impact body 240 just from the launching of the impact body 240 to the collision with the specimen S, and derives a head injury criteria (HIC) value necessary for headform impact evaluation through conversion of the measured acceleration.

Further, in the colliding, an accelerometer (not illustrated) is attached to the rear side of the specimen S, and the impact characteristics are verified through comparison of the acceleration of the impact body with the acceleration measured on the specimen S after the impact.

Although the present disclosure has been described with reference to the accompanying drawings and the preferred embodiments as described above, the present disclosure is not limited thereto, but is limited by claims to be described later. Accordingly, those of ordinary skill in the art to which the present disclosure pertains will appreciate that various modifications, additions and substitutions are possible, without departing from the scope and spirit of the disclosure as disclosed in the appended claims.

The invention claimed is:

1. An apparatus for an impact test comprising:
   a clamping unit configured to fix a specimen; and
   an impact unit spaced apart from the clamping unit and configured to accelerate and launch an impact body to collide with the specimen by an air pressure and an electromagnetic force;
   wherein the impact unit comprises:
      a compressed air module configured to provide an air pressure to the impact body in a direction in which the impact body is launched;
      an electromagnetic force module configured to provide an electromagnetic force to the impact body in the direction in which the impact body is launched; and
      a guide module configured to guide a path in which the impact body is launched.

2. The apparatus according to claim 1, wherein the clamping unit is configured to vary positions in vertical and horizontal directions and an installation angle of the fixed specimen.

3. The apparatus according to claim 1, wherein the clamping unit comprises:
   a first guide frame provided with a pair of vertical guide rails spaced apart from each other in a horizontal direction and disposed in parallel to each other along a vertical direction, and a pair of horizontal fixed bars each having both ends connected to end portions of the pair of vertical guide rails;

a second guide frame provided with a pair of vertical moving bars disposed between the pair of vertical guide rails and configured to move in the vertical direction along the vertical guide rails, and a pair of horizontal guide rails spaced apart from each other in the vertical direction and disposed in parallel to each other along the vertical direction;

a moving frame provided with a pair of horizontal moving bars disposed between the pair of horizontal guide rails and configured to move in the horizontal direction along the horizontal guide rails, and a pair of vertical fixed bars each having both ends connected to end portions of the pair of horizontal moving bars;

a pair of rotating plates provided on the pair of vertical fixed bars, respectively; and a fixed frame having both ends fixed to the pair of rotating plates, wherein an installation angle of the fixed frame is adjusted in accordance with a rotation of the rotating plates and the specimen is fixed to the fixed frame.

4. The apparatus according to claim 1, wherein the compressed air module comprises:

a chamber configured to provide a space in which a compressed air is expanded; and a first acceleration tube communicating with the chamber and configured to pass the expanded air therethrough.

5. The apparatus according to claim 4, wherein the electromagnetic force module comprises:

a second acceleration tube connected to communicate with a front end of the first acceleration tube to form a path in which the impact body is accelerated to move; and an electromagnet installed on an outer periphery of the second acceleration tube and configured to form a magnetic field in a direction in which the impact body moves forward through a power supply thereto.

6. The apparatus according to claim 5, wherein the guide module corresponds to a pair of guide bars installed to extend forward from an inner periphery of the second acceleration tube.

7. The apparatus according to claim 5, wherein the first acceleration tube and the second acceleration tube communicate with each other in a straight line, and are disposed in a vertical direction with respect to a gravity direction.

8. The apparatus according to claim 5, wherein an inner diameter of the first acceleration tube is smaller than a diameter of the impact body, and an inner diameter of the second acceleration tube is larger than the diameter of the impact body.

9. The apparatus according to claim 5, wherein the second acceleration tube is formed of a glass fiber reinforced plastic.

10. The apparatus according to claim 1, wherein the impact body comprises:

an outer body formed in a hollowed semispherical shape;

an inner body formed in a hollowed semispherical shape and disposed on an inner periphery of the outer body; and a combined body provided with an accelerometer and combined with a rear end of the outer body and the inner body.

11. The apparatus according to claim 10, wherein the outer body is made of a rubber material, and the inner body is made of a magnetic metal material.

12. The apparatus according to claim 10, wherein a groove portion for concentrating the air pressure is formed at a rear end of the combined body.

13. A method for an impact test comprising:

fixing a specimen;

accelerating an impact body using an air pressure and an electromagnetic force;

launching the accelerated impact body and making the impact body collide with the fixed specimen; and measuring an acceleration value of the launched impact body and an impact value generated on the specimen;

wherein the accelerating comprises:

first accelerating the impact body by the air pressure; and further accelerating the impact body by generating a magnetic field around the primarily accelerated impact body.

14. The method according to claim 13, wherein the accelerating comprises:

measuring a first acceleration value of the impact body being accelerated during the first accelerating, calculating a corrected acceleration value through comparison of the first acceleration value with a second acceleration value predetermined to make the impact body collide with the specimen, and adjusting a direction and strength of the magnetic field during the further accelerating to reflect the corrected acceleration value.

15. An apparatus for an impact test comprising:

a clamping unit configured to fix a specimen; and an impact unit spaced apart from the clamping unit and configured to accelerate and launch an impact body to collide with the specimen by an air pressure and an electromagnetic force;

wherein the impact body comprises:

an outer body formed in a hollowed semispherical shape;

an inner body formed in a hollowed semispherical shape and disposed on an inner periphery of the outer body; and a combined body provided with an accelerometer and combined with a rear end of the outer body and the inner body.

* * * * *